(12) United States Patent
Chapman

(10) Patent No.: US 10,165,847 B2
(45) Date of Patent: Jan. 1, 2019

(54) EXOSKELETON SYSTEM FOR LOAD CARRYING

(71) Applicant: THE COMMONWEALTH OF AUSTRALIA, Australian Capital Territory (AU)

(72) Inventor: Thomas Wayne Chapman, Bridgewater (AU)

(73) Assignee: THE COMMONWEALTH OF AUSTRALIA, Canberra (AU)

( * ) Notice: Subject to any disclaimer, the term of this patent is extended or adjusted under 35 U.S.C. 154(b) by 108 days.

(21) Appl. No.: 15/303,463

(22) PCT Filed: Apr. 15, 2015

(86) PCT No.: PCT/AU2015/000225
§ 371 (c)(1),
(2) Date: Oct. 11, 2016

(87) PCT Pub. No.: WO2015/157803
PCT Pub. Date: Oct. 22, 2015

(65) Prior Publication Data
US 2017/0035187 A1 Feb. 9, 2017

(30) Foreign Application Priority Data

Apr. 16, 2014 (AU) ................................ 2014901396
Sep. 23, 2014 (AU) ................................ 2014903797

(51) Int. Cl.
*A45F 3/10* (2006.01)
*B25J 9/00* (2006.01)
(Continued)

(52) U.S. Cl.
CPC ................ *A45F 3/10* (2013.01); *A45C 13/38* (2013.01); *A45F 3/00* (2013.01); *B25J 9/0006* (2013.01);
(Continued)

(58) Field of Classification Search
CPC .......... B25J 9/0006; B25J 9/104; A61H 3/00; A61H 2003/007; A45F 3/08; A45F 3/10
(Continued)

(56) References Cited

U.S. PATENT DOCUMENTS 5,834,789 A * 11/1998 Marchione ................ G21F 3/02
250/516.1
7,571,839 B2 8/2009 Chu et al.
(Continued)

FOREIGN PATENT DOCUMENTS

| CN | 201010287 | 1/2008 |
|---|---|---|
| CN | 101803966 | 8/2010 |

(Continued)

OTHER PUBLICATIONS

Notification Concerning Submission, Obtention or Transmittal of Priority Document for International Application No. PCT/AU2015/000225 dated Jun. 9, 2015.
(Continued)

*Primary Examiner* — Justin Larson
(74) *Attorney, Agent, or Firm* — Neal, Gerber & Eisenberg LLP

(57) ABSTRACT

The present disclosure relates to an exoskeleton system to be worn by a user. The system includes a load carriage arrangement configured to carry an applied load. The load carriage arrangement includes a frame, for example a frame for a backpack, and at least one non-rigid member. The at least one-non rigid member is arranged to transfer at least a first part of the applied load carried by the load carriage arrangement to the ground bypassing the user's musculoskeletal system. The system may further include a load sharing arrangement configured to transfer a second part of the applied load to the user's musculoskeletal system.

23 Claims, 9 Drawing Sheets

(51) Int. Cl.
*A45F 3/00* (2006.01)
*A45C 13/38* (2006.01)
*B25J 9/10* (2006.01)
*A45F 3/04* (2006.01)

(52) U.S. Cl.
CPC ........... *A45F 3/04* (2013.01); *A45F 2003/001* (2013.01); *B25J 9/104* (2013.01)

(58) Field of Classification Search
USPC ................................................ 224/628; 2/44
See application file for complete search history.

(56) References Cited

U.S. PATENT DOCUMENTS

| | | | |
|---|---|---|---|
| 8,968,222 B2* | 3/2015 | Kazerooni | B25J 9/0006 224/265 |
| 9,266,233 B2* | 2/2016 | Kornbluh | B25J 9/0006 |
| 9,351,900 B2* | 5/2016 | Walsh | A61H 1/024 |
| 9,427,864 B2* | 8/2016 | Kornbluh | B25J 9/0006 |
| 9,610,208 B2* | 4/2017 | Kazerooni | B25J 9/0006 |
| 9,662,262 B2* | 5/2017 | Hollander | A61H 3/00 |
| 9,782,322 B2* | 10/2017 | Nagarajan | A61H 3/00 |
| 9,950,422 B2* | 4/2018 | Kornbluh | B25J 9/0006 |
| 2002/0169402 A1 | 11/2002 | Hatton et al. | |
| 2004/0124224 A1 | 7/2004 | Arnold et al. | |
| 2007/0074327 A1* | 4/2007 | Davies | A61F 5/026 2/44 |
| 2007/0123997 A1 | 5/2007 | Herr et al. | |
| 2011/0105966 A1* | 5/2011 | Kazerooni | A61H 3/008 601/35 |
| 2012/0292361 A1* | 11/2012 | Thiruppathi | A45F 3/08 224/576 |
| 2013/0303950 A1* | 11/2013 | Angold | B25J 9/0006 601/35 |
| 2014/0330431 A1 | 11/2014 | Hollander et al. | |
| 2015/0366694 A1 | 12/2015 | Bujold et al. | |
| 2016/0107309 A1* | 4/2016 | Walsh | B25J 9/0006 248/550 |
| 2017/0035187 A1* | 2/2017 | Chapman | A45F 3/00 |
| 2017/0087716 A1* | 3/2017 | Bujold | A61F 5/0102 |
| 2017/0202724 A1* | 7/2017 | De Rossi | A61H 3/00 |
| 2017/0348176 A1* | 12/2017 | Herr | A61H 3/00 |
| 2018/0042803 A1* | 2/2018 | Amundson | A61H 1/0237 |
| 2018/0049903 A1* | 2/2018 | Witherspoon | A61F 5/01 |
| 2018/0125738 A1* | 5/2018 | Witte | A61H 3/00 |

FOREIGN PATENT DOCUMENTS

| | | |
|---|---|---|
| CN | 104337668 | 2/2015 |
| WO | WO 2010/101595 | 9/2010 |
| WO | WO 2011/002784 | 1/2011 |
| WO | WO 2013/086035 | 6/2013 |
| WO | WO 2016/036963 | 3/2016 |

OTHER PUBLICATIONS

International Application Status Report for International Application No. PCT/AU2015/000225, information valid as of Jul. 16, 2015.
Written Opinion of the International Searching Authority for International Application No. PCT/AU2015/000225 dated Jul. 1, 2015.
International Search Report for International Application No. PCT/AU2015/000225 dated Jul. 1, 2015.
M. Cherry and D. Ferris. "An Elastic Exoskeleton for Assisting Human Running" Proceedings of the ASME 2009 International Design Engineering Technical Conferences & Computers and Information in Engineering Conference Aug. 30-Sep. 2, 2009.
Internet articled: Inventors' Workshop—Exo Project Proposal, http://www.militaryaerospace.com/articles/print/volume-23/issue-07/news/news/springactive-asked-to-refine-a-robotic-system-designed-to-help-foot-soldiers-carry-heavy-loads.html, dated 2013.
Internet article: SpringActive asked to refine a robotic system designed to help foot soldiers carry heavy loads, http://www.militaryaerospace.com/articles/print/volume-23/issue-07/news/news/springactive-asked-to-refine-a-robotic-system-designed-to-help-foot-soldiers-carry-heavy-loads.html, dated Jul. 1, 2012.
A. M. Dollar and H. Herr, "Lower Extremity Exoskeletons and Active Orthoses: Challenges and State-of-the-Art", IEEE Transactions on Robotics, vol. 24, No. 1, Feb. 2008.
N. Jarrasse and G. Morel. "On the kinematic design of exoskeletons and their fixations with a human member". In Proceedings of Robotics: Science and Systems (RSS'2010), Jun. 2010.
K. N. Gregorczyk, J. P. Obusek, L. Hasselquist, J. M. Schiffman, C. K. Bensel, D. Gutekunst, and P. Frykman, "The effects of a lower body exoskeleton load carriage assistive device on oxygen consumption and kinematics during walking with loads," presented at the 25th Army Sci. Conf., Orlando, FL, Nov. 27-30, 2006.
G. S. Sawicki and D. P. Ferris, "Powered ankle exoskeletons reveal the metabolic cost of plantar flexor mechanical work during walking with longer steps at constant step frequency", The Journal of Experimental Biology 212, 21-31, Published by the Company of Biologists 2009.
M. B. Wiggin, G. S. Sawicki and Steven H. Collins, " an Exoskeleton Using Controlled Energy Storage and Release to Aid Ankle Propulsion", 2011 IEEE International Conference on Rehabilitation Robotics, Rehab Week Zurich, ETH Zurich Science City, Switzerland, Jun. 29-Jul. 1, 2011.
C. Walsh, K. Endo, H. Herr, A Quasipassive Leg Exoskeleton for Load Carrying Augmentation, International Journal of Humanoid Robotics, World Scientific Publishing Company, 2007.
Supplementary European Search Report for Application No. EP 15 77 9491 dated Nov. 6, 2017.

* cited by examiner

EXOSKELETON SYSTEM FOR LOAD CARRYING

PRIORITY CLAIM

This application is a national stage application of PCT/AU2015/000225, filed on Apr. 15, 2015, which claims the benefit of and priority to Australian Provisional Patent Application No. 2014901396, filed on Apr. 16, 2014, and which claims the benefit of and priority to Australian Provisional Patent Application No. 2014903797, filed on Sep. 23, 2014, the entire contents of which are each incorporated by reference herein.

TECHNICAL FIELD

The present disclosure relates to exoskeletons and more particularly to lower extremity exoskeleton systems configured to facilitate the user carrying heavy loads for extended periods while mitigating fatigue and the risk of injury.

BACKGROUND

Many different forms of exoskeletons have been developed to augment the strength of the user, augment the endurance of the user, facilitate locomotion of the user over differing terrains or to support a payload being carried by the user.

Although exoskeletons have broad potential use applications, there is increasing interest in the use of exoskeletons by soldiers to mitigate fatigue and injury associated with carrying high load burdens. However, if exoskeletons are to be successfully used by soldiers they need be relatively quiet during operation and importantly not impede normal movement or unduly increase the physical effort in taking such movement.

There are two basic types of lower extremity exoskeletons. The first type of exoskeleton is known as an 'active' exoskeleton. Active exoskeletons include some form of mechanical power generation device (e.g., motors and actuators) to carry the load and thereby increase the 'carrying power' of the user. However, such mechanical power generation devices require a power source that must also be carried by the user.

The second type of lower extremity exoskeleton is known as a 'passive' exoskeleton. Passive exoskeletons do not include any form of power generation device to carry the load. Rather they are intended to operate to mitigate fatigue and injury by transferring through rigid rods or linkages (sometimes referred to as "leg struts") as much as possible of the user's backpack payload directly to the ground. Fatigue and injury mitigation is achieved because a proportion of any such payload is transferred directly to the ground bypassing the musculoskeletal system of the user. As the musculoskeletal system of the user is not subject to the transferred load, the user is less prone to fatigue and high load injuries.

U.S. Patent Application Publication No. 2012/0292361 teaches a backpack exoskeleton arranged to transfer the load of the backpack to the ground surface therefore reducing the effective weight of the backpack on the user. The right and left exoskeleton legs each include a thigh rod which is connected to a knee unit. The knee unit includes large and small knee wheels and bearings. The knee unit is provided to simulate the back and forth movement of the human knee. A bottom rod connects to the knee unit and extends all the way to the ground and bends underneath the arch of the user's shoe producing an arch rod. Hyperextension of the knee is prevented by a wheel stop that limits rotational movement of the bottom rod. Various points of adjustment are provided to ensure that the knee unit is located in line with the user's knee and to match the user's anatomy.

To date, typical lower extremity exoskeletons that have been developed, both active and passive, have not effectively reduced or matched the energy cost to the user. Furthermore, exoskeletons have not been accepted for use by soldiers. Many different problems with such exoskeletons have been identified. For example, the power supply used with active exoskeletons has a limited duration. During a military operation where a new power supply is not readily available or recharging not possible, the soldier must either discard the exoskeleton or continue to carry it. Discarding the exoskeleton is a relatively very expensive option and continuing to carry the exoskeleton is not advantageous because of the increased fatigue and injury risks.

Many soldiers are reluctant to wear exoskeletons because they are poorly integrated with the user and thus there is increased risk of the soldier becoming 'snagged' on foreign objects. This is particularly likely in dense terrain. Furthermore, existing exoskeletons are relatively cumbersome and thus restrict movement that may be needed particularly in an active situation. For example, a soldier wearing such an exoskeleton may have increased difficulty rolling and crawling.

Typical lower extremity exoskeletons are attached to the user at various points and are difficult to doff quickly if required.

For best performance, typical exoskeletons need to be calibrated to the individual user to match their anthropometrics. This is a relatively complex and lengthy process with lower extremity exoskeletons because the joint centres of the hip, knees and ankles must align with those of the exoskeleton. Accommodating the wide and ranging physical requirements of individual users with lower extremity exoskeletons may require increased cost, logistics and training.

Prior art lower extremity exoskeletons use rigid leg struts, multiple degree-of-freedom joints coupled to sensors and computers to mimic the human skeletal system and its kinematics. Matching human kinematics with an exoskeleton that is offset to the skeletal system is a very complex task and misalignment issues often cause unwanted forces that impair normal human kinematics and result in increased metabolic cost during locomotion. Trials by US Army Natick Soldier Centre have shown increases in metabolic cost of up to 40% using a lower extremity rigid-link exoskeleton (Gregorczyk et al. 'Effects of a lower body exoskeleton device on metabolic cost and gait biomechanics during load carriage', *Ergonomics*, Vol. 53, No 10, October 2010, pp. 1263-1275). Mass, especially distal mass, has been identified along with kinematic incompatibility as the other main cause of exoskeletons causing increased energy cost to the user.

The present disclosure seeks to provide in one aspect an improved lower extremity exoskeleton system. The present disclosure also provides in other aspects an item of clothing, and a length of fabric.

The discussion of the background to the disclosure herein is included to explain the context of the disclosure. This is not to be taken as an admission that any of the material referred to was published, known or part of the common general knowledge as at the priority date of this application.

SUMMARY

According to the present disclosure there is provided an exoskeleton system to be worn by a user, said system including a load carriage arrangement configured to carry an applied load and at least one non-rigid member arranged to transfer at least a first part of the applied load carried by the load carriage arrangement to the ground bypassing the user's musculoskeletal system.

The first part of the applied load to be transferred to the ground is hereafter referred to as the "transfer load".

In certain embodiments, the exoskeleton system includes a harness suitable to enable the exoskeleton system to be worn by the user. The harness is configured so as to enable the load carriage arrangement to be carried by the user but in such a manner that the transfer load can be transferred to the ground and not to the musculoskeletal system of the user.

In certain embodiments, the harness is arranged to be located in use over the shoulders of the user and includes first and second straps. The harness may also optionally include a waist belt and/or hip belt and/or a sternum strap.

The load carriage arrangement may be arranged to be permanently connected to the harness, hung from the harness or connected by some form of quick release system. In each instance, the connection is such to ensure that the transfer load is transferred to the ground bypassing the user's musculoskeletal system.

In one form, the load carriage arrangement includes a frame arranged to support the applied load. The frame may, for example, be attached to or integrated with a backpack or other like device. The frame may be an external frame to which a backpack can be fitted or otherwise attached. Alternatively, the frame may be an internal frame located within a backpack. In certain embodiments, the frame, in use, is arranged to prevent the backpack from slumping over the user and effectively "resting" on the user's back. The frame or another member may facilitate to establish an air-gap between the backpack and the user's torso improving user comfort.

In certain embodiments, the exoskeleton system may also further include a load sharing device. The load sharing device being arranged to transfer a second part of the load carried by the load carrying arrangement to the user's shoulders and/or to other parts of the user's body (e.g., hips or waist). The second part of the load is hereafter referred to as the "shoulder load". Accordingly, when an exoskeleton system according to an embodiment of the disclosure optionally includes such a load sharing device, the load carried by the load carrying arrangement is distributed between the transfer load and the shoulder load. The shoulder load is arranged to be passed through the user's musculoskeletal system and the transfer load is arranged to bypass the user's musculoskeletal system. It is envisioned that the shoulder load would be a much smaller load than the transfer load. Indeed it is expected that about 50% to about 70% or about 50% to about 80% of the load carried by the load carrying arrangement would be transferred directly to the ground as the transfer load. However, smaller load transfer percentages may still be advantageous, for example about 20%, about 25%, about 30%, about 35%, about 40%, about 45% and about 50%.

In certain embodiments, the exoskeleton system further includes an interface device arranged for connection to the at least one non-rigid member. The interface device being arranged to interface between the at least one non-rigid member and the ground so that transfer load can be transferred to the ground.

The non-rigid member may adopt any form capable of transferring a load from the load carriage arrangement to the ground, typically but not necessarily via an interface device. The non-rigid member is capable of flexure so that it can bend when the user moves through a range of motions (e.g., walking, running, sitting, squatting etc).

In accordance with a first embodiment of the disclosure, the at least one non-rigid member includes an inner cable housed within an outer cable housing or sheath. The inner cable is arranged for movement relative to the outer sheath whilst the ends of the outer sheath are constrained from movement. Non-rigid members of this type are well known and are commonly referred to as push/pull Bowden cables, control cables and are used, for example, as steering or throttle cables. The inner cable is arranged so that the transfer load is applied thereto and is thereby conveyed to the ground, such as via the interface device.

The use of other forms of non-rigid member to transfer the transfer load to the ground bypassing the user's musculoskeletal system is envisioned. Suitable non-rigid members would include, for example, an outer flexible housing containing a non-compressible fluid (i.e., the fluid is substituted for the inner cable). Such an arrangement would be similar to a flexible brake line and may provide an advantageous range of allowable housing bend radius. Such an arrangement would be sealed to prevent leakage and may further incorporate a valve and fluid reservoir.

In accordance with one form of the disclosure that does not include a load sharing device, the inner cable of the non-rigid member has an upper part arranged, in use, to be loaded with the transfer load. In certain embodiments, the upper part is formed as a length of rigid rod. The upper part of the inner cable may be directly attached to the load carriage arrangement or may be attached to a load attachment coupling. In certain embodiments, the load attachment coupling is arranged to be directly or indirectly connected to the load carriage arrangement so that the transfer load can be applied to the inner cable of the non-rigid member via the load attachment coupling. The outer sheath of the non-rigid member is arranged to be constrained from movement at or adjacent to an upper part thereof.

The inner cable has a lower part arranged, in use, to be connected with the interface device. The interface device is arranged to transfer all or a part of the transfer load to the ground.

The interface device may adopt different configurations but in at least one form is arranged to be connected to or mounted on the user's footwear (e.g., a boot, shoe, ski). The lower part of the inner cable is arranged for connection to the footwear interface. In certain embodiments, this connection is achieved by way of a multi degree of freedom coupling (e.g., a ball joint coupling, a flexible coupling or a two-degree of freedom coupling). The interface device may alternatively be formed as part of or attached to a prosthesis.

In certain embodiments, the outer sheath of the non-rigid member is arranged to be constrained at or adjacent to a lower end thereof. In certain embodiments, the lower end of the outer sheath is restrained by attachment to an outer sheath brace connected to the user's footwear. This attachment may be direct or via a coupling or brace.

In accordance with one embodiment, the interface device further includes a toe part, a heel part and a multi-degree of freedom joint to which the lower end of the inner cable is secured.

In certain embodiments, two non-rigid members, for example two push/pull Bowden cables, are provided to transfer the transfer load to the ground. Typically, in use, one of the cables runs generally along a first leg of the user and the other of the cables runs generally along a second leg of the user.

At least one brace or support may be provided at a position along each leg to enable attachment thereto of the respective non-rigid member. The brace or support helps to locate the associated non-rigid member (e.g., the cable) close to the leg of the user, reducing the risk of the non-rigid member catching or engaging on other objects. The brace or support may take the form of a member or band extending around the user's leg and may be configured to connect the non-rigid member at that point to the member or band. In certain embodiments, the member is an adjustable strap with quick release attachment (e.g., hook and loop fastener or snap fit). The connection may be achieved, for example, using a tie system or hook and loop type fasteners.

Another embodiment of the disclosure includes the load sharing device. In one form, the load sharing device is configured to transfer the second part of the load carried by the load carrying arrangement (i.e., the shoulder load) to the user's shoulders and/or other part(s) of the user's body. Such a configuration may include one or more, such as two, load sharing straps. In certain embodiments, the load sharing straps are arranged to be connectable between the harness and the attachment coupling and are, in certain embodiments, adjustable for tension to change the percentage of transfer load to shoulder load. In use, it will thus be understood that the total load carried by the load carrying arrangement is distributed between the shoulder load and the transfer load thereby establishing a load sharing system. This load distribution and thus load sharing system is potentially advantageous compared to non-load sharing exoskeleton systems as the user is actively aware, due to the applied shoulder load, of the load being carried and the impact that load may have on their balance as they manoeuvre due to the load's moment of inertia.

The load sharing straps may be separate from or incorporated as part of a harness. Such a harness may include additional straps to properly secure the harness to the user. In certain embodiments, the harness further includes one or more spacers to space one or more parts of the load carriage arrangement at a required distance from the user's torso to provide an air gap. Alternatively, the load carrying frame is configured to establish the required spacing.

It is recognized that the user will tend to incline their upper body forwardly in response to the load applied to the load carriage arrangement. To avoid or reduce the likelihood of the load being transferred to the user's back it is desirable to ensure a low friction interface between the user's back and the exoskeleton system. For example, a low friction interface (e.g., rollers) may be established between the load carriage arrangement (e.g., the frame) and the user's back.

In accordance with another embodiment of the disclosure, the harness includes a platform serving to prevent or at least limit downward movement of the harness in the direction of an applied load. This movement of the harness may be due to natural compression of the soft tissue of the user's shoulders when a load is applied and/or 'stretch' of the harness when the load is applied. Downward movement of the harness in the direction of the applied load is firstly limited by distributing the applied load over the area of the platform thus reducing the load applied at each contact point with the user's shoulders. In accordance with one embodiment, the platform includes at least one panel configured so as to distribute the applied load across the user's shoulders and/or to other parts of the user's body. In certain embodiments, the load is distributed substantially evenly and in a manner that minimises compression of the soft tissue of the user's shoulders etc. The at least one panel may include right and left side shoulder sections. The area of the shoulder sections of these embodiments is maximized to facilitate distribution of the applied load to a greater surface area of the user and hence minimise soft tissue compression.

The at least one panel may further include a back section which is, in certain embodiments, configured to extend across the width of the user's back. The right and left shoulder sections may also extend down a length of the user's back.

In certain embodiments, the platform is arranged to be hung from the user's shoulders.

In accordance with at least one embodiment of the disclosure, the back section and right and left shoulder sections are integrally connected and may be moulded as a single unit from, for example, a plastic material or a carbon fibre reinforced material.

In certain embodiments, the right and left shoulder sections are substantially rigid so when a load is applied to the harness, that load is distributed substantially evenly across the user's shoulders. Some of that load may be transferred to other parts of the body, for example the hips. The back section of certain embodiments is also substantially rigid so that when a load is applied to the harness, a point on the back section of the platform is maintained substantially fixed with respect to a land mark on the body of the user.

In certain embodiments, when the non-rigid member is a Bowden cable, an upper end of the outer sheath of the cable is arranged to be secured to the point on the back section of the platform. It will thus be appreciated, that when a load is applied to the harness, the point of connection between the outer sheath of the cable and the platform will remain substantially fixed with respect to the land mark on the body of the user and thus downward movement of the upper end of the outer sheath is substantially prevented.

The disclosure also provides a method of using an exoskeleton system worn by a user to transfer at least a first part of an applied load to the ground, said exoskeleton system including a load carriage arrangement arranged to receive the applied load, said method including the steps of: applying the first part of the applied load to at least one non-rigid member of the exoskeleton system, wherein the non-rigid member is arranged to transfer the first part of the applied load to the ground bypassing the user's musculoskeletal system.

The method may also include the step of transferring a second part of the applied load to the user's shoulders and/or other part(s) of the user's body.

According to a second aspect of the disclosure there is provided an item of clothing including at least one non-rigid member, said at least one non-rigid member being arranged in use to transfer at least a part of a load applied to an upper part of the non-rigid member to a lower part of the non-rigid member. The at least one non-rigid member is, in certain embodiments, an inner cable housed within an outer sheath and adopts the form of a Bowden cable. It is envisioned that such an item of clothing could be configured to transfer at least a part of the applied load to another item or surface, for example to the ground via an article of footwear. In this manner, that load would not pass through the musculoskeletal system of the wearer and thus the wearer may have improved stamina and be less likely to become fatigued.

In accordance with one embodiment of the second aspect of the disclosure, the item of clothing is arranged to be worn on the lower part of the body and may adopt the form of a pair of pants or leggings.

According to a still further aspect of the disclosure there is provided a length of fabric including at least one non-rigid member, said at least one non-rigid member arranged so that when the fabric is used to construct a product, at least a part of a load applied to an upper part of the non-rigid member can be transferred to a lower part of the non-rigid member.

Additional features and advantages are described in, and will be apparent from the following Detailed Description and the figures.

BRIEF DESCRIPTION OF DRAWINGS

Embodiments of the disclosure will now be described, by way of example only, with reference to the accompanying drawings in which.

DETAILED DESCRIPTION

Various references are made herein to hook and loop fastener connections or VELCRO® connections. It will be appreciated that these connections required a first panel of hooks and a second panel of loops. The hooks and loops of the panels engage to establish a connection. To simplify the following description, reference will hereafter be made to different VELCRO® components, without identifying whether the component includes a hook or loop panel.

Figure 1:
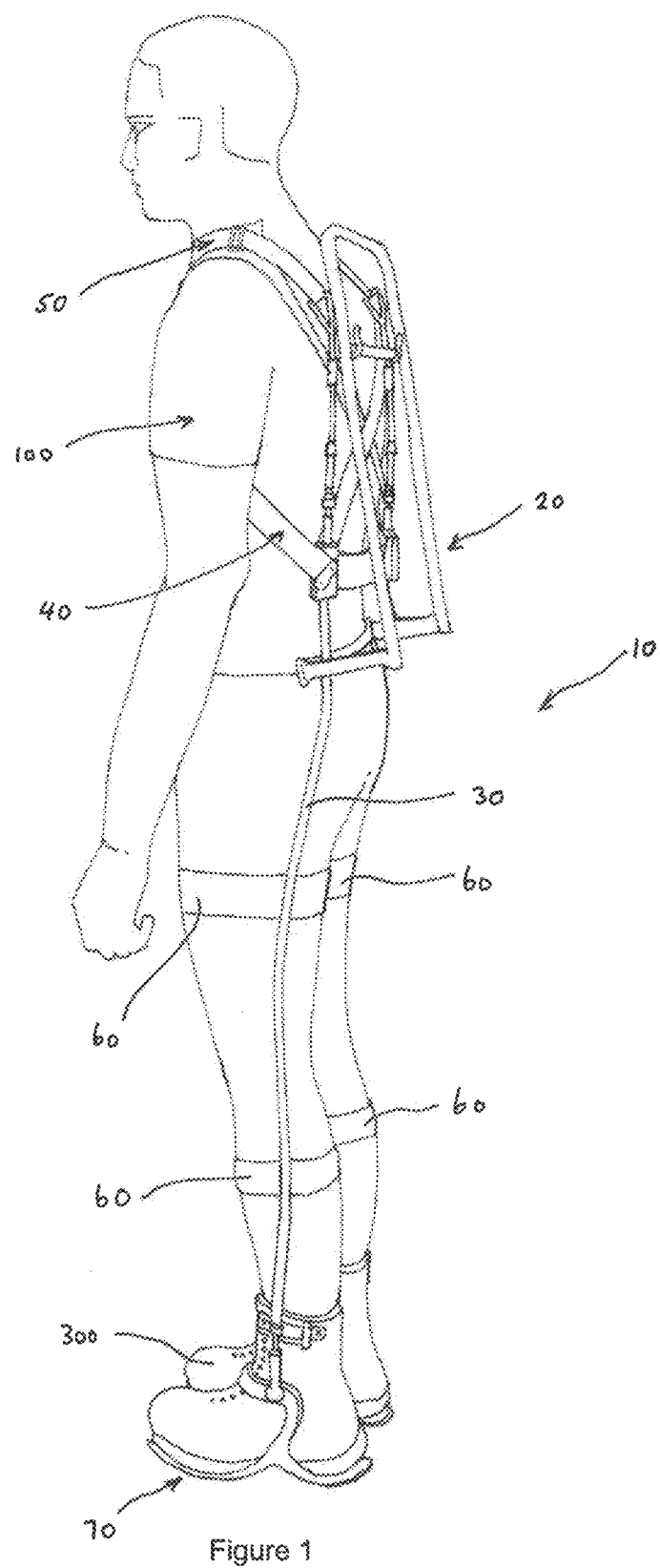
FIG. 1 is a schematic representation of a lower extremity exoskeleton system according to an embodiment of the disclosure fitted to a user.

Referring now to the example embodiments of the present disclosure illustrated in FIGS. 1 to 10, with reference to FIG. 1 which illustrates schematically a lower extremity exoskeleton system 10 in accordance with a first embodiment of the disclosure. The exoskeleton system 10 is shown as worn on a user 100. The exoskeleton system 10 includes a load carriage arrangement configured to carry a load, the load carriage arrangement adopting the form of a frame 20 for a backpack (not shown). It should be understood however, that the load carriage arrangement may adopt different forms and thus the present disclosure is not to be limited to arrangements wherein the load carriage arrangement is a frame. The load carriage arrangement may adopt any form that enables a load to be applied thereto. For example, the load carriage arrangement may adopt a form suitable to support the weight of breathing equipment (e.g., breathing equipment used by firefighters), fluid containers or other devices or equipment conventionally carried by the user.

The exoskeleton system 10 further includes at least one non-rigid member 30. In certain embodiments, two non-rigid members 30 (one associated with each leg of the person wearing the exoskeleton system 10) are provided and are each arranged to transfer a portion of a first part of the load carried by the frame 20 to the ground 200. The first part of the load carried by the frame 20 will hereafter be referred to as the "transfer load".

Figure 2:
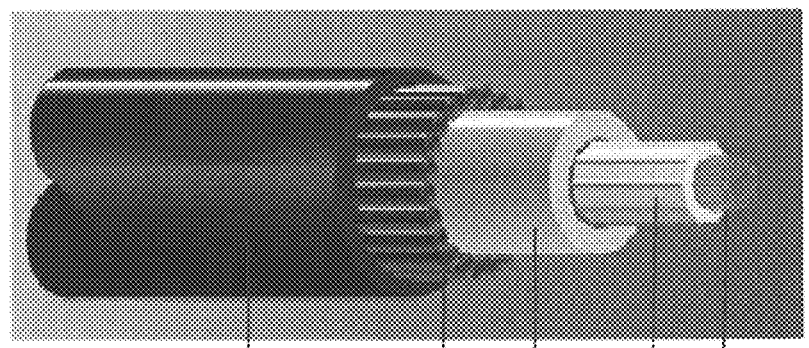
FIG. 2 is a cut-away view of a push/pull Bowden cable of a type suitable for use in an embodiment of the disclosure.

The exoskeleton system 10 shown in FIGS. 1 and 2 further includes a harness 40 suitable to enable the exoskeleton system 10 to be worn by the person 100. The harness is configured so as to enable the frame 20 to be carried by the user but in such a manner that the transfer load can be transferred to the ground and not through the user's musculoskeletal system. This configuration will be described in more detail below.

FIG. 1 also schematically depicts a load sharing device 50, leg braces 60 and ground interface devices 70. Each of these components and their respective functions will be described in more detail subsequently.

Figure 1A:
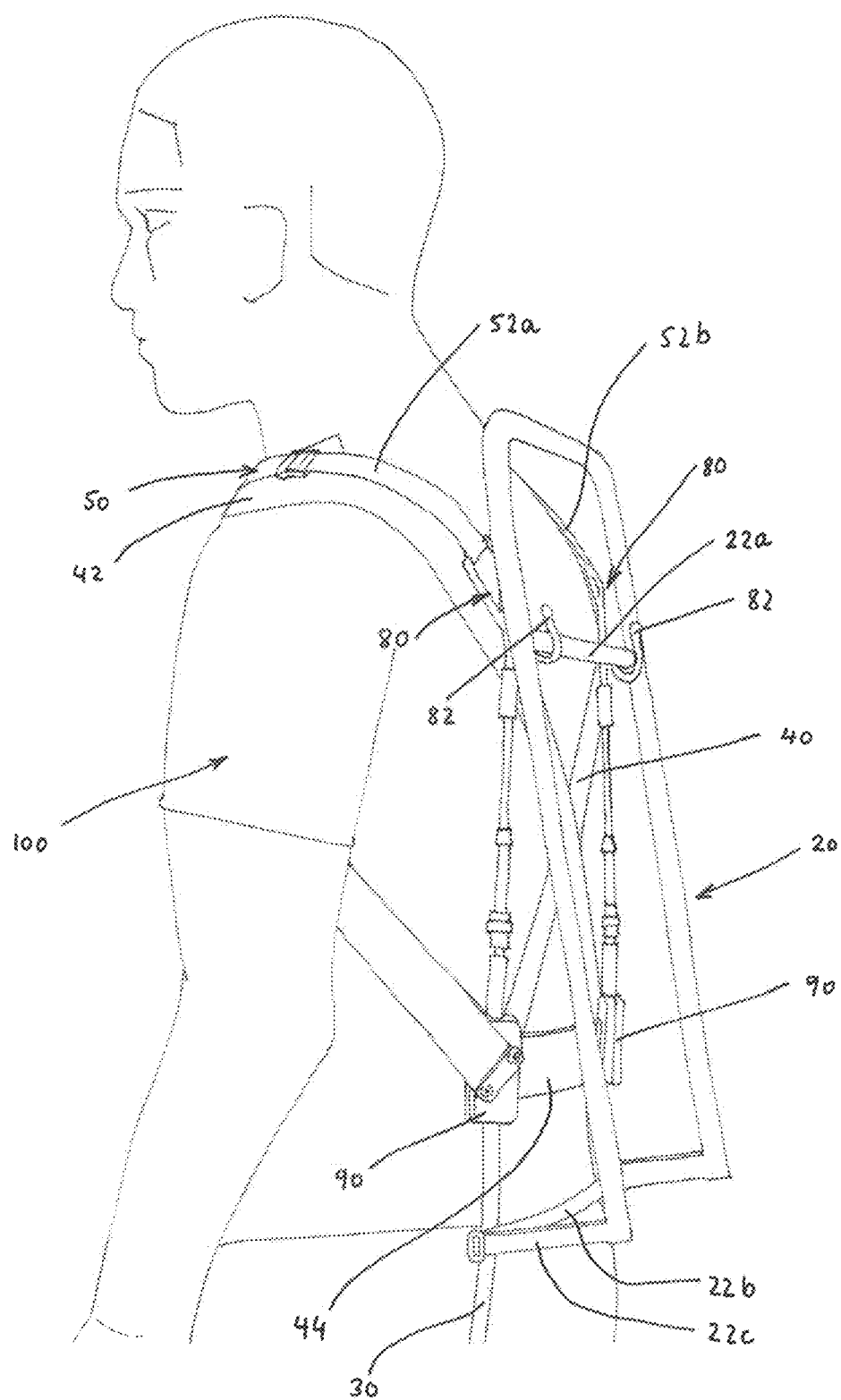
FIG. 1A is an enlarged side view of an upper part of the exoskeleton system shown in FIG. 1.

FIG. 1A more clearly depicts the frame 20, harness 40 and load sharing device 50 of the exoskeleton system 10. As shown, the frame 20 is a lightweight frame that adopts a generally inverted U-shaped configuration. The frame 20 as depicted is an external frame for a backpack. The frame 20 may adopt different configurations and may, for example, be either an external or internal frame of a backpack or the like. As depicted, the frame 20 further includes a cross member 22a, a strap 22b and spacer members 22c. The cross member 22a is configured to enable connection of the frame 20 to the non-rigid members 30. The exact nature of the connection between the frame 20 and non-rigid members 30 will depend on factors such as, for example, the type of frame 20 being used (e.g., internal or external), the number or quantity of non-rigid members 30, whether quick release of the frame 20 is required and whether the exoskeleton system 10 includes the load sharing device 50. In certain embodiments, the exoskeleton system 10 includes such a load sharing device 50, but it is envisioned that inclusion may be optional.

In certain embodiments, the strap 22b of the frame 20 is made from webbing and is arranged in use to rest against the user's body. The spacer members 22c establish a space between the user's body and the inverted U-shaped part of the frame 20. Further, the spacer members 22c establish the angular orientation of the U-shaped part of the frame 20.

The harness 40 as depicted in FIG. 1A includes first and second shoulder straps 42 (i.e., right and left shoulder straps) that are looped to enable the user's arms to be located through the loops. In certain embodiments, each shoulder strap 42 includes an adjustable snap clip connector so that the strap 42 can be readily adjusted to suit the user and to enable quick release. A rigid spacer bar 44 provides connection points for the ends of the shoulder straps 42. The rigid spacer bar 44 is also arranged for connection to each of the non-rigid members 30 so as to constrain their movement laterally.

Although not illustrated, the harness 40 may include further straps to properly secure the harness 40 to the wearer's torso. The shoulder straps 42 as illustrated are made of non-elastic webbing, although other materials may be used. In certain embodiments, the shoulder straps 42 are adjustable to ensure user comfort and desired positioning of the frame 20 on the user. Webbing buckles, hook and loop type fastener material or other adjustors may be provided to enable adjustment of the shoulder straps 42.

In certain embodiments, the exoskeleton system 10 shown in FIGS. 1, 1A and 2 includes the load sharing device 50. Load sharing device 50 enables a second part of the load carried by the frame 20 to be transferred to the user's shoulders and/or other part(s) of the user's body. This second part of the load is hereafter referred to for simplicity as the "shoulder load". The inclusion of the load sharing device 50 enables the load carried by the frame 20 to be distributed between the shoulder load and the transfer load. Further, it is possible to vary the amount of the shoulder load compared to the transfer load to some extent, as will be explained later, by varying the vertical tension and/or capacity of the strap(s) of the load sharing device 50. It will thus be understood that when a load sharing device 50 is included in the exoskeleton system 10 according to an embodiment of the disclosure, the load carried by the frame 20 is distributed between the shoulder load and the transfer load thereby establishing a load sharing system. The load sharing system is advantageous compared to non-load sharing arrangements as the user is actively aware of the load being carried and the impact that load may have on their balance as they manoeuvre due to the load's moment of inertia.

As depicted, the load sharing device 50 includes first and second load sharing straps 52a, 52b, one load strap 52a, 52b being located generally over each shoulder of the user. In certain embodiments, the load straps 52a, 52b are made from an elastic material and as will be explained in more detail below, serve to retain a generally upwards tension on a part of the attachment coupling 80.

Although not visible FIGS. 1 to 5, a forward end of each load strap 52a, 52b is arranged to be secured to respective straps 52a, 52b of the harness 40. A rearward end of each load sharing strap 52a, 52b is arranged to enable connection to the frame 20. As shown, this connection is achieved via an attachment coupling 80, including a hook 82. Hook 82 is arranged so that it can be hooked about the cross member 22a of the frame 20, effectively enabling the frame 20 to hang via the hooks 82 from the attachment coupling 80. In this manner, the frame 20 (i.e., the load carriage arrangement) can be carried by the user. However, as described below, the transfer load is transferred via the attachment coupling 80 to the ground bypassing the user's musculoskeletal system.

Each load sharing strap 52a, 52b is arranged so that it can be tensioned. Tensioning may be achieved by tightening the load straps 52a, 52b using buckles, hook and loop type connections and other suitable adjustments mechanisms. Changing the tension of the load straps 52a, 52b changes the amount of load transferred to the wearer's shoulders (i.e., changes the amount of the shoulder load).

FIG. 1A also more clearly depicts how attachment coupling 80 is connected to both the load sharing device 50 and to the frame 20 and how the two non-rigid members 30 are connected to the attachment coupling 80. These connections enable load transfer to the ground (i.e., the transfer load) and load transfer to the shoulders (i.e., the shoulder load).

The non-rigid members 30 of the exoskeleton system 10 of FIGS. 1 and 2 are push/pull Bowden cables. A push/pull Bowden cable is a flexible mechanical linkage that conveys a compression or tension (push or pull) force to a system component at a location remote to the original force. The resultant force vector is usually non-linear to the original force. A push/pull Bowden cable includes an inner cable and an outer sheath. Such a push/pull Bowden cable has its own integrated constraint system which enables the inner cable to convey an applied force to a remote location. A push/pull Bowden cable system includes a push/pull Bowden cable with one end of the inner cable being subject to an applied force in the direction of the cable and the other end of the inner cable receiving the conveyed force. The outer sheath needs only to be constrained at each end for the system to operate. When an external pushing or compression force is applied to the end of the inner cable, the inner cable attempts to buckle (due to reaction forces) and applies side forces to the inside of the outer sheath. Resistance from the outer sheath prevents the inner cable from buckling and directs the inner cable to move and/or convey the applied force via the path of the cable.

As discussed above, push/pull Bowden cables comprise an inner cable and an outer sheath. The outer sheath may incorporate several layers and constrains lateral movement of the inner cable. The inner cable may be a multi-strand or a single high tensile wire that may also be encased in a low friction material. The efficiency of the cable is dependent on the minimization of backlash (i.e., clearance between the inner cable and inside diameter of the outer sheath) and the minimization of friction between these surfaces. The outer sheath typically incorporates a high tensile wire layer. The stiffness provided by this layer prevents the outer sheath from being curved beyond a minimum specified radius and thereby prevents the inner cable from permanent deformation and minimizes friction between the inner cable and the inside of the outer sheath. Push/pull Bowden cables are typically rated to a maximum force capacity. Push/pull Bowden cables incorporate a constrained rigid end section (typically a stainless steel rod within a tube) at either end of the inner cable to prevent buckling at this section which is not constrained by the outer sheath.

Figure 3A:
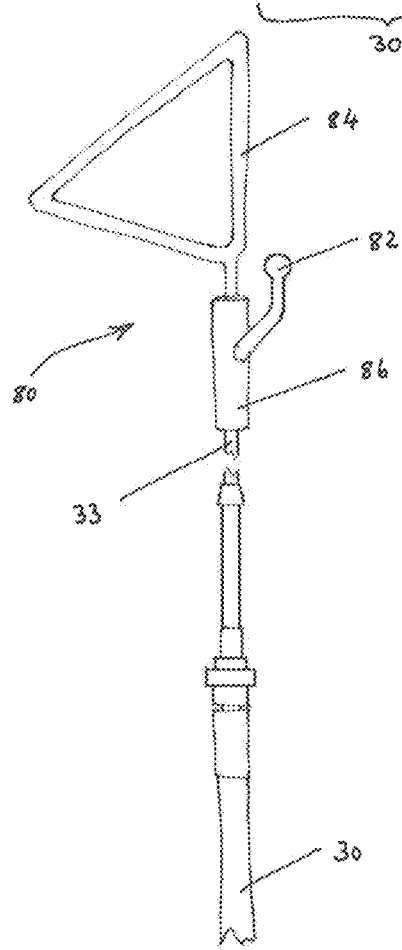
FIGS. 3A and 3B illustrate first and second arrangements configured to connect the upper end of the inner cable to a load.

FIG. 2 illustrates the configuration of a push/pull Bowden cable 30 suitable for use in an embodiment of the disclosure. The cable 30 shown in the Figures includes an inner cable 30a having a composite construction including an inner wire 30a' and a plastic cover 30a". The inner cable 30a is housed within an outer sheath 30b. Outer sheath 30b is also adopts a composite construction including an outer plastic cover 30b', wire 30b" and plastic liner 30b'''. An upper end of the inner wire 30a' of the inner cable 30a extends into or attaches to a rigid rod 33 (see FIGS. 3A and 3B). In certain embodiments, rigid rod 33 is made of stainless steel and is attached to an associated attachment coupling 80. FIG. 3A illustrates in more detail the attachment coupling 80 of FIGS. 1 and 1A and FIG. 3B illustrates an alternative form of attachment coupling 80'.

The attachment coupling 80 shown in FIG. 3A includes hook 82 (or other suitable mechanism) configured to enable connection of the frame 20 so that load carried on the frame 20 is transferred to the attachment coupling 80 and the transfer load is transferred to the rigid rod 33 and inner cable 30a connected thereto. An upper part 84 of the attachment coupling 80 is arranged to be connected to its associated load sharing strap 52a, 52b. As shown in FIG. 3A, that connection is achieved by a looped element (for example a loop of a triangular shape or a slot), forming part of the attachment coupling 80, through which an end of the associated load strap 52a, 52b can be passed and a connection formed preventing release of the end of the load strap 52a, 52b. Accordingly, some of the load transferred from the frame 20 to the attachment coupling 80 will be transferred as the shoulder load to the load sharing straps 52a, 52b.

A lower end 86 of the attachment coupling 80 is arranged for attachment to the inner cable 30*a* of the associated cable 30. It will thus be appreciated that the non-rigid member (e.g., cable 30) extends between the attachment coupling 80 (i.e., the location at which the first part of the applied load is applied to the non-rigid member) and the user's footwear.

Figure 3B:
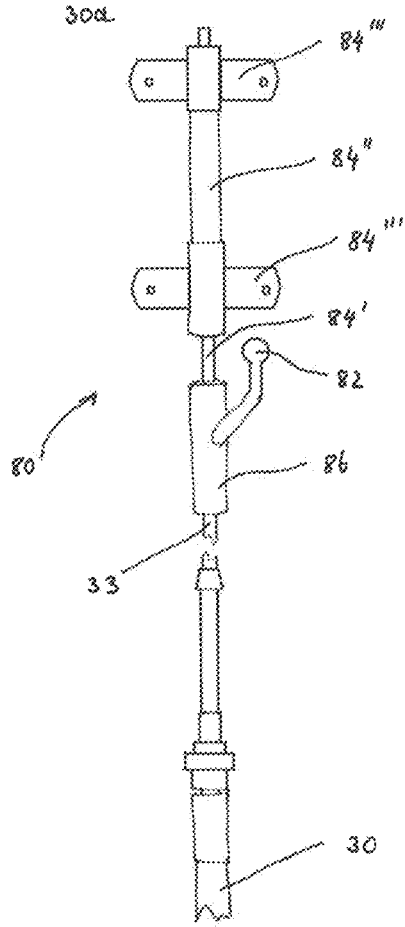

The attachment coupling 80' of FIG. 3B is similar to the attachment coupling 80. However, instead of including the looped element 84 to enable connection to the associated load strap 52*a*, 52*b*, the upper part includes a rigid rod 84', a rod guide or bearing 84" and one or more saddles 84'". Rod 84' is an extension of the rigid rod 33 of the inner cable 30*a* and the saddles 84'" are arranged to be attached to the harness 42. Rod 84' is connected to the guide 84" to prevent the coupling 80' and the inner cable 30*a* from being pulled or bent over by the load force. Rod 84' acts as a support to prevent the attachment coupling 80' from moving from a generally upright position once a force is applied thereto from the backpack load. Rod 84' runs through bearing 84" to constrain the rod 84' and keep it aligned with the rigid rod 33. Such an arrangement is not required when the attachment coupling 80 of FIG. 3A is adopted because the tension from the load sharing straps 52*a*, 52*b* keep the rigid rod 33 orientated generally upright. It is envisioned that bearing 84" is restrained by the saddles 84'" or by some other type of bracing system affixed to the straps 42.

The upper part of the outer sheath 30*b* of the respective cable 30 is braced to ensure limited movement in the direction of the load applied to the inner cable 30*a*. As shown in FIG. 1A, the cables 30 are held in a required position relative to one another and so that they do not move in the direction of the applied load by respective cable holders 90. Each of the cable holders 90 is located on the rigid spacer bar 44 of the harness 40. In accordance with the illustrated embodiment, the ends of each strap 40,42 is connected to their respective cable holder 90. However, this need not be the case. For example, the ends of the straps 42 may be connected directly to the rigid spacer bar 44.

Figure 4:
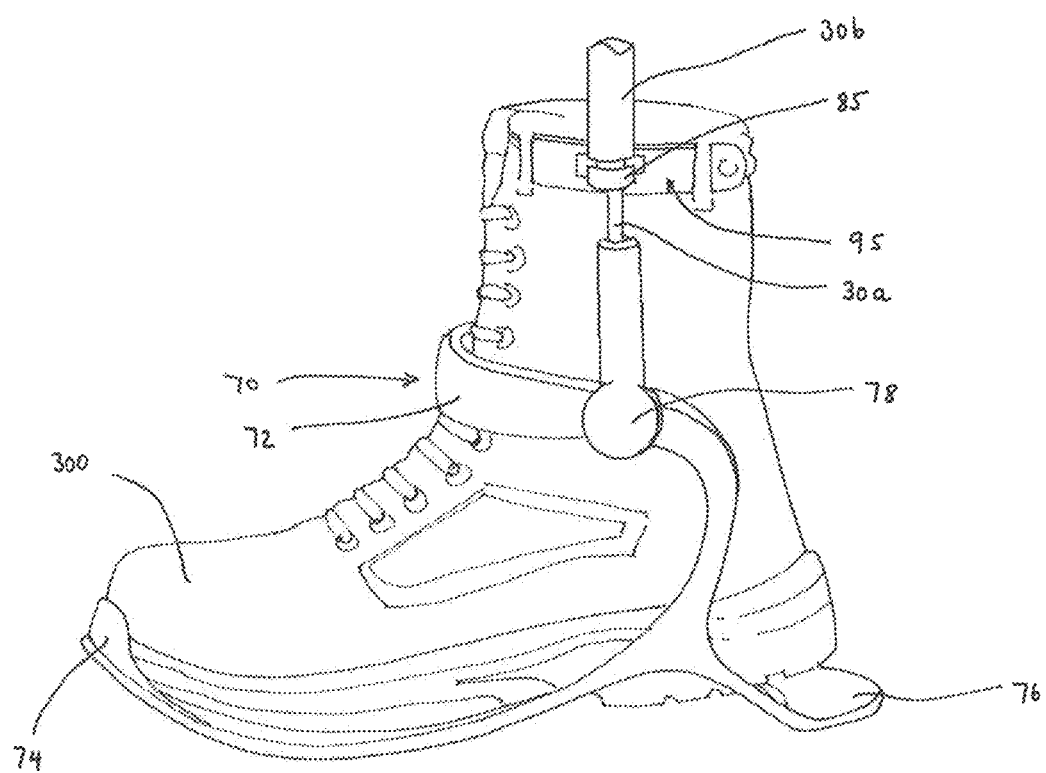
FIG. 4 is a side view of an interface device connected to an item of footwear such as a boot.

As shown in FIG. 4, the lower part of the outer sheath 30*b* of the cable 30 is held and braced, via a casing cap 85, in a required position relative to the user's footwear 300 by an outer sheath brace 95. The brace 95 is shown secured to the user's footwear 300 by a saddle. However, other forms of connection are envisioned.

Boot 300 is fitted with the brace 95 and also the interface device 70. It will of course be appreciated in light of earlier comments, that the disclosure is not intended to be limited for use with only such a boot 300.

The interface device 70 depicted includes a first part 72 that wraps at least partially about the front part of the boot 300, a toe section 74 arranged to be located under the front or toe part of the boot 300 and a heel section 76 arranged to be located under the heel of the boot 300. The interface device 70 further includes a connection configured to connect the lower end of the inner cable 30*a* to the interface device 70. In certain embodiments, this connection is achieved by way of a multi degree of freedom coupling 78 (e.g., a ball joint coupling).

The attachments configured to secure the lower part of each cable 30 (such as both the inner cable 30*a* and outer sheath 30*b*) are, in certain embodiments, achieved using some form of quick release coupling(s) to enable quick release of the cable 30 from the boot 300 and/or the interface device 70. Further, adjustors should be provided to enable the length of each of the cables 30 to be readily adjusted to a length suitable for the particular user of the exoskeleton system 10. For example, coupling 78 may be attached to a threaded rod that is attached to the inner cable 30*a* and can be screwed in and out to vary the length to suit the user As well as conveying the transfer load to the ground 200, it is envisioned that the interface device 70 may serve as an energy storage device during human locomotion. The interface device 70 is, in certain embodiments, manufactured from a lightweight high tensile material (e.g., 7075 alloy) and the heel and toe sections 76, 74 act as a spring, storing and releasing energy at various parts of a gait cycle. For example, the toe section 74 stores energy during terminal-stance and pre-swing, and releases that energy during step-off. Energy storage devices have been used in prior lower extremity exoskeleton configurations (refer B. Wiggin et. al. 2011, C. Walsh et. al. 2007, S. Sawicki and D. Ferris, 2008). The present disclosure is not limited for use with any particular such energy storage devices.

As best shown in FIG. 1, during use of the exoskeleton system 10, each cable 30 is arranged to be located close to the associated leg of the user. As the cables 30 are non-rigid they are able to flex and move as the user moves through a range of motions. For example, when the user runs, bends or squats, the cables 30 bend through a range of shapes. One or more braces or supports 60, for example leg straps, may be provided to position each cable 30 adjacent to or firmly against the respective leg of the user. Positioning the cables 30 in this manner helps to prevent the cables 30 from snagging on foreign objects and may be more comfortable for the user. Additionally, it is envisioned that the cables 30 may be covered by the user's clothing (e.g., trousers).

It is envisioned that many different forms of interface device 70 may be adopted for use with an exoskeleton system 10 according to an embodiment of the disclosure. In one form the interface device may be a boot attachment arrangement that connects the inner cable 30*a* to a sole section of the boot or to an attachment to the boot and the outer sheath to a part of the boot 300.

The exoskeleton system 10 as described includes two non-rigid members 30. However, it is envisioned that this need not be the case and that other numbers or quantities of non-rigid members 30 may be included.

The exoskeleton system 10 described above is a passive system. However, it is envisioned that the disclosure could be operational in conjunction with an active system and, in that event, a power source would need to be provided to power the active part of the exoskeleton system.

Figure 5:
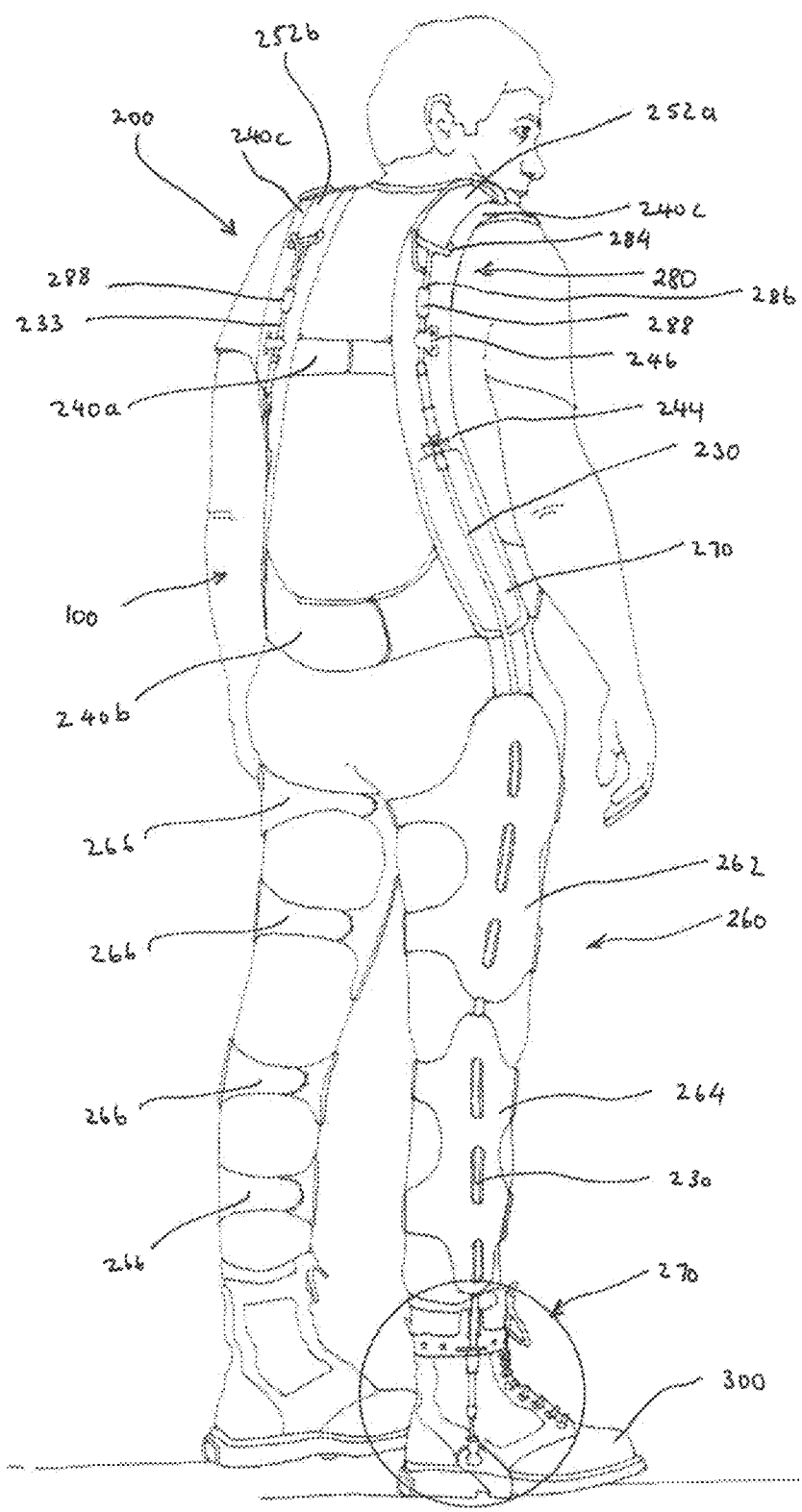
FIG. 5 is a rear view of an exoskeleton system according to a second embodiment of the disclosure (without the load carriage arrangement) fitted to a user.
Figure 6:
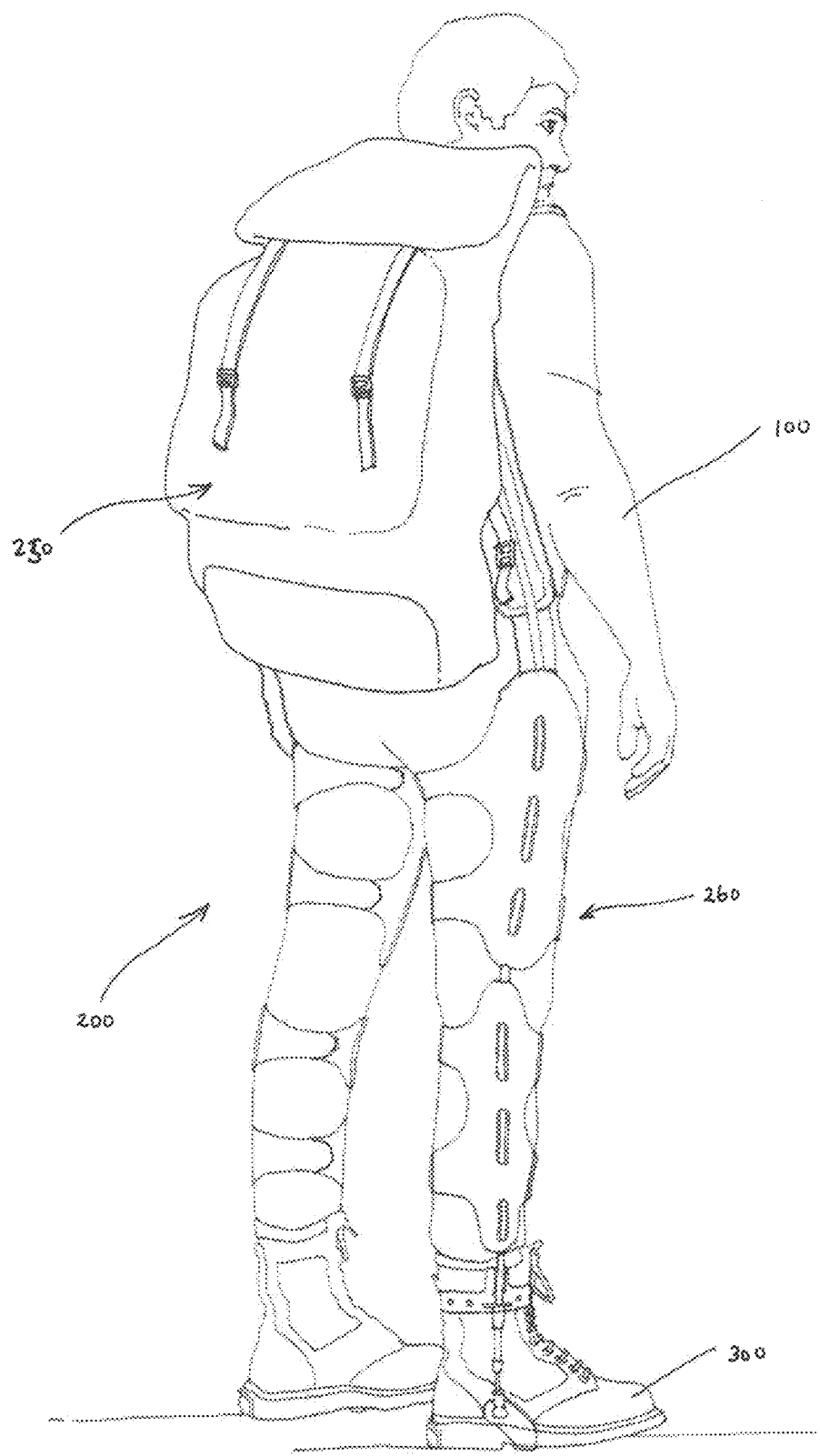
FIG. 6 is a view similar to FIG. 5 but with a backpack (i.e., the load carrying arrangement) attached to the exoskeleton system.
Figure 7:
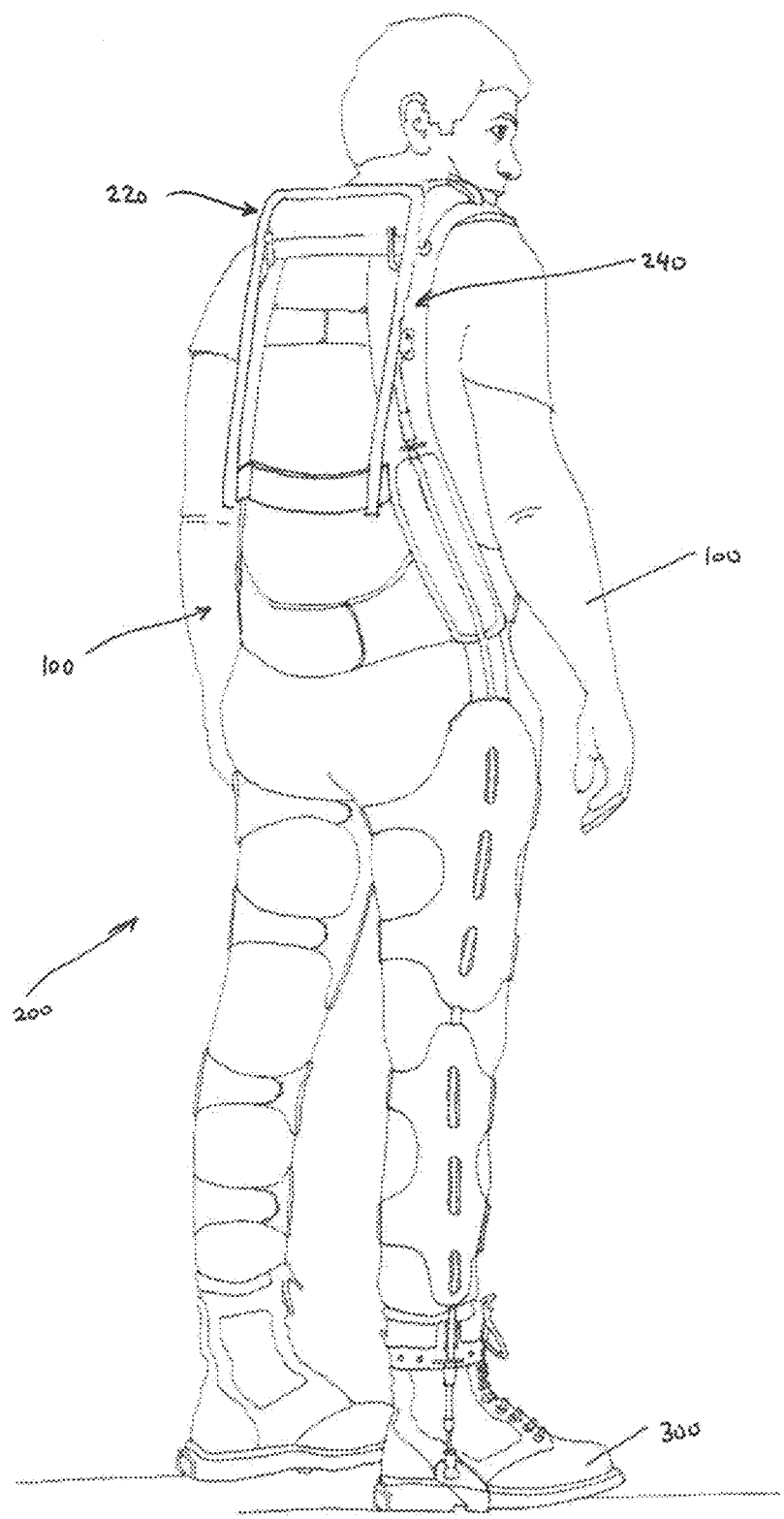
FIG. 7 is a view similar to FIG. 5 additionally showing the frame of the backpack which enables attachment of the load carrying arrangement (backpack) to the exoskeleton system.

FIGS. 5 to 9 illustrate a second embodiment of the disclosure. In accordance with this second embodiment, the exoskeleton system 200 is arranged to be used in conjunction with a load carriage arrangement in the form of a backpack 250 (see FIG. 6). The backpack 250 includes a frame 220 or other connection configuration that enables the backpack 250 to be connected to the exoskeleton system 200 and so that the load of the backpack 250 (and anything it contains) is transferred to the exoskeleton system 200. FIG. 7 depicts the external frame of the backpack 220 as mounted on the exoskeleton system 200.

The exoskeleton system 200 includes a harness. The harness adopts a different configuration to the harness 40 previously described in relation to the first embodiment of the disclosure. In accordance with this second embodiment, the harness includes a platform 240 serving to prevent or at least limit downward movement of the harness in the direction of an applied load due to natural compression of the soft tissue of the user's shoulders when the load is applied and/or 'stretch' of the harness when the load is applied. This is achieved by firstly distributing the applied load over the area of the platform 240 thus reducing the load applied at each contact point with the user's shoulders. As will be explained more below, the platform 240 also serves to locate a point on the platform 240 substantially fixed with respect to a land mark on the body of the user 100.

In accordance with this second embodiment and as illustrated in FIGS. 5 to 9, the platform 240 includes an upper and a lower back section 240a, 240b and right and left shoulder sections 240c. The back sections 240a, 240b and shoulder sections 240c are configured so that the platform 240 can effectively hang from the user's shoulders via the platform 240. The underside of the shoulder sections 240c may be padded to increase the user's comfort during use. The lower back section 240b as illustrated forms a waist belt. The upper part of each shoulder sections 240c adopts a curved or hooked configuration (when viewed from the side) so that the platform 240 can be hooked over the user's shoulders. The lower part of each shoulder section 240c runs along a part of the user's back, effectively forming right and left back panels of the platform 240. In certain embodiments, the shoulder sections 240c and back sections 240a, 240b are shaped so as to conform generally with the user's shoulder and back shape. As will be appreciated by a person skilled in the art, the platform 240 may vary in shape and configuration. For example, the platform 240 may include a part, for example a back panel, that extends between the right and left shoulder sections 240c and that part may include cut-away sections. Such cut-away sections being provided to reduce the weight of the platform 240 and to also facilitate ventilation to the user's back. The platform may adopt a more vest-like configuration.

The platform 240 may adopt different forms but, in certain embodiments, incorporates a mechanism to adjust the platform 240 to better fit the user (e.g., to accommodate wider or narrower girths). For example, a corset-type arrangement may be adopted to enable variation in the width (i.e., width across the chest and/or back) or length of the back section. Alternatively, as illustrated, the upper and lower back sections 240a, 240b may be adjustable using VELCRO® fastening arrangements to enable for different chest and body dimensions (i.e., the distance between the shoulder sections 240c of the platform 240 can be reduced or enlarged).

In various embodiments, the back sections 240a, 240b and shoulder sections 240c are made from a light weight material, are substantially rigid to facilitate even distribution of an applied load and are sized and shaped to distribute the applied load across the user's shoulders and/or to other parts of the user (e.g., the hips or waist area). In certain embodiments, the back sections 240a, 240b and shoulder sections 240c are molded from a plastic material or a carbon fibre reinforced material. The substantially rigid nature of the platform 240 also minimises unwanted flexure when a load is applied to the harness.

In certain embodiments, the back sections 240a, 240b are configured to enable twisting of the user's body during normal movement.

Figure 9:
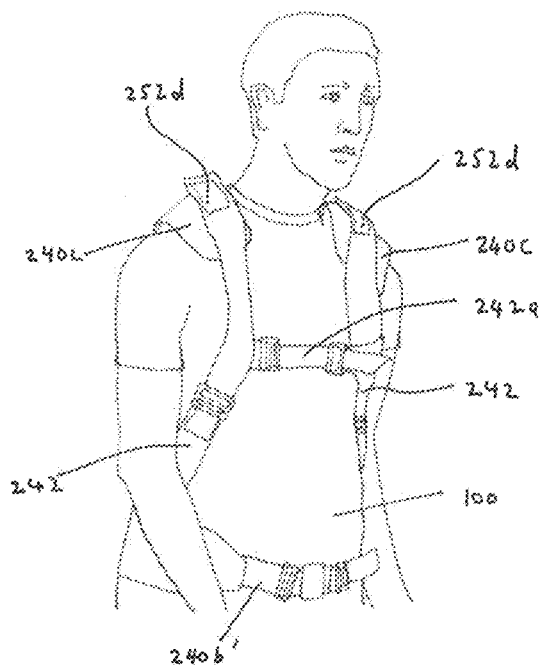
FIG. 9 is a front view of the exoskeleton system showing the straps attached to the shoulder sections of the platform.

As shown in FIG. 9, the platform 240 further includes first and second straps 242 looped to enable the user's arms to be located through the loops. In certain embodiments, each strap 242 is adjustable in length to ensure user comfort and the desired positioning of the upper and lower back section 240a, 240b and shoulder sections 240c on the user 100. In certain embodiments, each shoulder strap 242 includes an adjustable snap clip connector so that each strap 242 can be readily adjusted to suit the user and to enable quick release of the platform 240.

The straps 242 as illustrated are made of non-elastic webbing, although other materials may be used. Webbing buckles, hook and loop type fastener material or other adjustors may be provided to enable adjustment of the shoulder straps 242. The platform 240 may include further straps to ensure proper securement to the user's torso (e.g., chest or sternum strap, waist strap). As shown in FIG. 9, the lower back section 240b connects to an adjustable waist strap 240b' and an adjustable sternum strap 242a is located between each of the shoulder straps 242 in the area of the user's sternum.

Exoskeleton system 200 includes a load sharing device. As will be understood from earlier discussion, the load sharing device enables a first part of the load (i.e., the "transfer load") carried in the backpack 250 to be transferred to the ground and the second part of the load carried in the backpack 250 to be transferred to the user's shoulders and/or to other part(s) of the user's body (i.e., "the shoulder load). The inclusion of the load sharing device thus enables the load carried in the backpack 250 to be distributed between the shoulder load and the transfer transferred to the ground.

The load sharing device of the second embodiment of the disclosure is similar to the previously described load sharing device 50 and includes right and left shoulder load sharing strap 252a, 252b. Each load sharing strap 252a, 252b is arranged so that it can be tensioned. Tensioning may be achieved by tightening the load straps 252a, 252b using buckles, hook and loop fastener connections and other suitable adjustments mechanisms. Changing the tension of the load straps 252a, 252b changes the amount of load transferred to the wearer's shoulders (i.e., changes the amount of the shoulder load).

Figure 8:
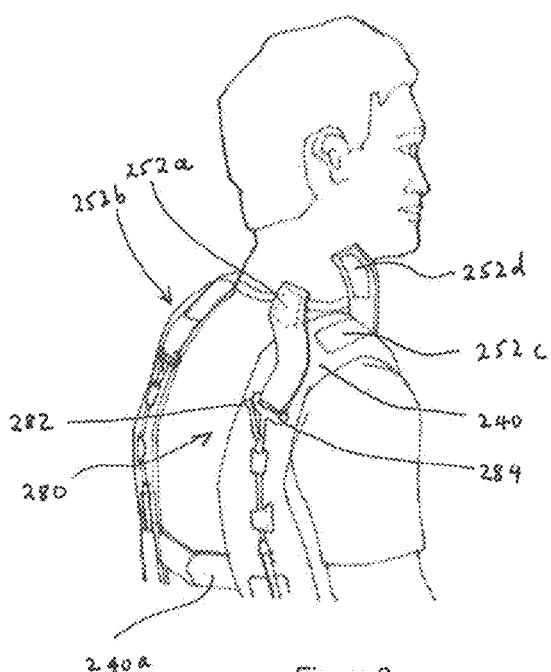
FIG. 8 is an upper side view of the exoskeleton system show in FIG. 5 that depicts how the load sharing system is attached to the platform of the harness.

In accordance with the second embodiment, the forward end of each load sharing strap 252a, 252b is arranged to be secured to the respective rigid shoulder section 240c of the platform 240. FIG. 8 illustrates how the connection of the right load sharing strap 252a is achieved. It will be appreciated that load sharing strap 252b may be connected in a similar manner.

Load sharing strap 252a is connected to the shoulder section 240c of the platform 240 using VELCRO® connections that enable the forward end of the load strap 252a to be sandwiched between VELCRO® connectors 252c and 252d. VELCRO® connector 252c is firmly secured to the rigid shoulder section 240c and in this way the forward end of the load strap 252a can also be firmly secured to the shoulder section 240c.

The rearward end of each load sharing strap 252a, 252b is arranged for connection to the attachment coupling 280. As best shown in FIG. 5, attachment coupling 280 includes a hook 282. Hook 282 is arranged so that it can be hooked about a part of the backpack 250 (for example the frame 220 of the backpack 250), effectively enabling the backpack 250 to hang via the left and right side hooks 282 from the attachment couplings 280. In this manner the backpack 250 and any load carried therein can be carried by the user. However, as discussed previously, only the shoulder load is transferred to the user's shoulders whilst the transfer load is transferred via the attachment coupling 280 to the ground, thereby bypassing the user's musculoskeletal system.

As shown in FIG. 5, the attachment coupling 280 further includes an upper part 284 arranged to enable connection to the associated load sharing strap 252a, 252b. As shown, the connection is achieved by a looped element through which an end of the associated load strap 252a, 252b can be passed and a connection formed preventing release of the end of the load strap 252a, 252b from the respective attachment coupling 280.

A lower end 286 of the attachment coupling 280 is arranged for attachment to a non-rigid member 230 so that the transfer load can be transferred to the ground. The non-rigid member 230 is a push/pull Bowden cable including an inner cable 230a and an outer sheath 230b. To this end, the lower end 286 of the attachment coupling 280 is connected to the inner cable 230a of the associated cable 230 so that the transfer load can be transferred to the ground. This is achieved by a joiner 288 that has an upper end that can be screwed onto the lower end 286 of the attachment coupling 280 and a lower end that can be screwed onto a rigid rod 233 that is in turn connected to the inner cable 230a. Various other mechanisms configured to achieve the same result are anticipated.

It will be noted that the outer sheath 230b of the cable 230 is anchored to the platform 240, which is substantially rigid, with the intention to minimise any movement of the anchoring point of the outer sheath 230b in the direction of the load applied to the inner cable 230a. It has been recognized that by anchoring the outer sheath 230b of cable 230 to a point on the platform 240 in this manner, the anchoring point is maintained substantially fixed with respect to the landmark on the body of the user even when a load is applied to the harness. This improves the efficiency of transfer of the transfer load to the ground as compared to the first embodiment of the disclosure.

As discussed previously, it was found that the upper end of the outer sheath 30b of each cable 30 of the first embodiment was subject to some downward movement when the load was applied to the inner cable 30a. That downward movement being due at least in part to natural compression of the soft tissue of the user's shoulders and also due to stretch of the material of the straps 42 of the harness 40. However, the inclusion of a substantially rigid platform 240 as part of the harness that hangs from the user's shoulders has reduced the impact of any soft tissue compression resulting in increased load transfer efficiency. Further, mounting the outer sheath 230b on the substantially rigid shoulder section 240c of the platform 240 rather than on the cable holder 90 (which was attached to an end of the strap 42 of the harness 40), helps prevent unwanted downward movement of the outer sheath 230b. In other words, such an arrangement substantially fixes the location of that connection point with respect to the land mark on the body of the user. It is envisioned that greater efficiency of load transfer to the ground via the Bowden cable will be achieved when any movement of the upper end of the sheath 230b either towards or away from the land mark on the user, is either prevented or at least minimized.

As best shown in FIG. 5, when the right and left leg cables 230 are in use they are anchored at respective anchor points on the platform 240 by anchoring brackets 244 so that the outer sheaths 230b, in so far as possible, are substantially fixed relative to the land mark on the user's body and are prevented from movement in the direction of the applied load. Each cable 230 slots into its associated bracket 244 in a manner that constrains the outer sheath 230b, preventing downward movement. As illustrated, bracket 244 receives a groove formed in the metal outer cable end of the cable 230, thereby anchoring the outer sheath 230b in position on the lower part of the rigid shoulder section 240c.

Located above each anchoring bracket 244 is a second bracket 246. Bracket 246 serves to further constrain the outer sheath 230b and also prevents the cable 230 from being pulled rearward (i.e., away from the user's back) by the torque of the backpack load. Bracket 246 is a generally C-shaped bracket configured to enable the cable 230 to be hooked therein.

Each anchor bracket 244 and second bracket 246 are configured so that the respective cable 230 can be disengaged therefrom and thus released from the harness 240. As will be described later, this is necessary to enable removal of the cables 230 and the associated leg braces 260 as may be required by the user 100.

Figure 5A:
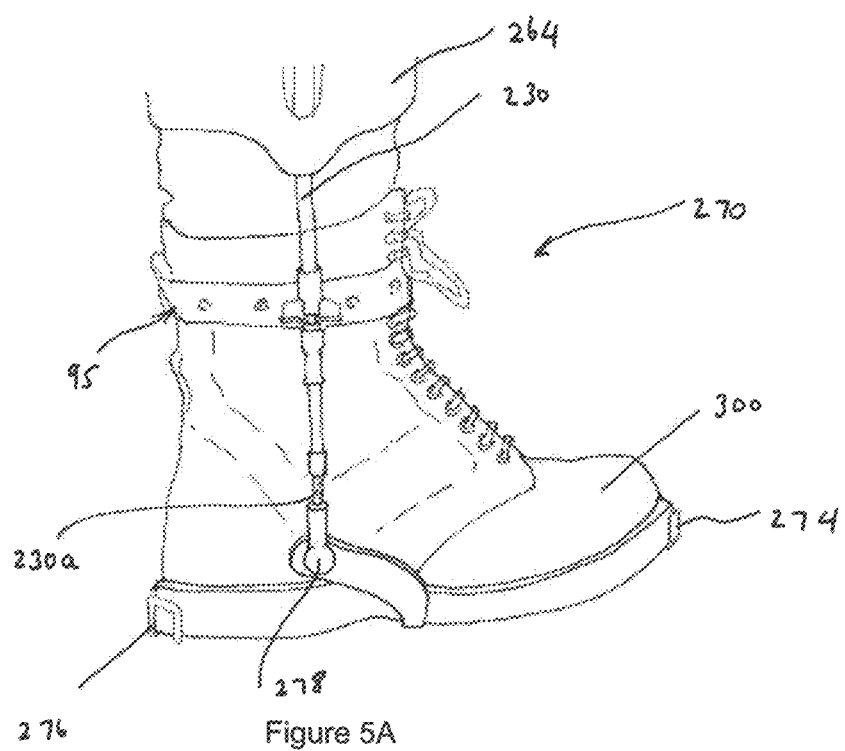
FIG. 5A is an enlarged view of the circled portion in FIG. 5.

The lower part of the outer sheath 230b of the cable 230 is secured to the user's footwear 300 as illustrated in FIG. 5A. It will be noted that this connection is substantially in accordance with the connection described previously in relation to the first embodiment of the disclosure.

As shown in FIGS. 5 to 7, the leg brace 260 provided in association with each cable 230 of the second embodiment of the disclosure is different to the arrangement described in connection with the first embodiment of the disclosure.

Each leg brace 260 includes an upper rigid member 262 and a lower rigid member 264. In certain embodiments, upper rigid member 262 extends from about the user's hip to above the user's knee, whilst the lower rigid member 262 extends from below the user's knee to a point above or adjacent to the user's boot 300. The upper and lower rigid members 262, 264 are arranged to run along the outer side of the user's leg and are configured to constrain the cable 230 so that, in so far as reasonably possible, the cable 230 is held substantially vertically and so that it overlies the joint centres of the user's leg. To this end, the upper and lower rigid members 262, 264 include a channel or tube through which the cable 230 extends and which restrains lateral movement of the cable 230. The upper and lower rigid members 262, 264 are configured so that the user 100 can move through a range of required movements without restriction. In certain embodiments, the upper and lower rigid members 262, 264 are profiled on their innermost side (i.e., the side against the user's leg) to be complementary to the outer side profile of the user's leg to increase user comfort. In certain embodiments, straps 266 are provided to secure the upper and lower rigid members 262, 264 to the user's leg.

In certain embodiments, the upper and lower rigid members 262, 264 are each molded from a plastic material or a carbon reinforced material.

Leg brace 260 is provided to resist bending of the cable 230 under the forces of the applied transfer load. It has been recognized that there is greater efficiency in transferring the applied load to the ground when the cable 230 is retained straight and generally vertical. Accordingly, the leg brace 260 is provided to prevent excessive buckling of the cable 230 and to retain the cable 230 in that generally vertical position whenever possible. As will be readily understood, buckling of the cable 230 will inevitably occur during various movements of the user (e.g., squatting, running etc.). However, in so far as it is reasonably possible, the leg brace 260 aims to maintain the desired vertical orientation of the cable 230.

It will be appreciated that this embodiment of the disclosure is configured so that both the left and the right side cables 230, their associated load sharing devices and their associated braces 260 can be disconnected from the rigid harness 240 and the lower ends of the cables 230 disconnected from the respective boots 300. This enables these components to be removed from the harness 240 when not required and to be otherwise carried by the user.

As will now be explained, VELCRO® connections may further be provided as effective to locate each cable 230 generally on the platform 240 in the required position during use of the system 200 and to also properly position the upper rigid member 262 relative to the platform 240.

One method of connecting the right side cable 230 and related components to the platform 240 will now be described. It will be appreciated that the left side cable 230 and related components may be connected in a similar manner.

As best shown in FIG. 5, a first VELCRO® panel 270 is secured to the platform 240 and is located below the right side anchoring bracket 244. Although not illustrated, it will be understood that a second VELCRO® panel may be located over the first panel 270 so that a section of the cable 230 is located firmly therebetween. This secures the cable 230 in position.

It will be appreciated that the intention is to secure the cable 230 so that it is retained generally vertically over the part of the platform 240 below the anchoring bracket 244 and to minimise excessive bending or buckling of the cable 230 as it extends towards the upper rigid member 262. Securing the cable 230 in this matter also prevents the possibility of this part of the cable 230 being snagged on other objects. As discussed previously, the cable 230 then feeds through the channel formed in each of the upper and lower rigid members 262, 264 of the leg brace 260 before being connected to the interface device 270 attached to the user's boot 300.

Disconnection of the right side cable 230 and related components from the platform 240 is achieved by simply pulling up connector 252d and pulling load strap 252a away therefrom. The load strap 252a with attachment coupling 280 fixed to the cable 230 can then be disengaged from the second bracket 246 and the anchoring bracket 244. The second VELCRO® panel (not illustrated) is then disconnected from first panel 270 effectively freeing the cable 230 from the platform 240 of the harness.

As shown in FIG. 5, the lower part of cable 230 is connected to the interface device 270 using a quick release system. Once this connection is released, the straps 266 of the brace member 260 can be released from around the user's legs. All of the components associated with the right side cable 230 of the exoskeleton system 200 are then disconnected and thus made free of the user 100. Those components can then be rolled up and stored in the user's backpack 250. The left side cable 230 and related components of the exoskeleton system 200 are disconnected in a similar manner.

It will be appreciated that the stripped platform 240 can then still be worn by the user 100. The backpack 250 is positioned over the stripped platform 240 and is worn in the conventional manner using the conventional straps of the backpack 250 to locate it on the user's shoulders. The platform 250 may include connection systems configured to enable the user 100 to connect other items (e.g., small packs, ammo pouches) thereto. Further, the platform 240 is configured to support body armor to protect the user 100.

Figure 10:
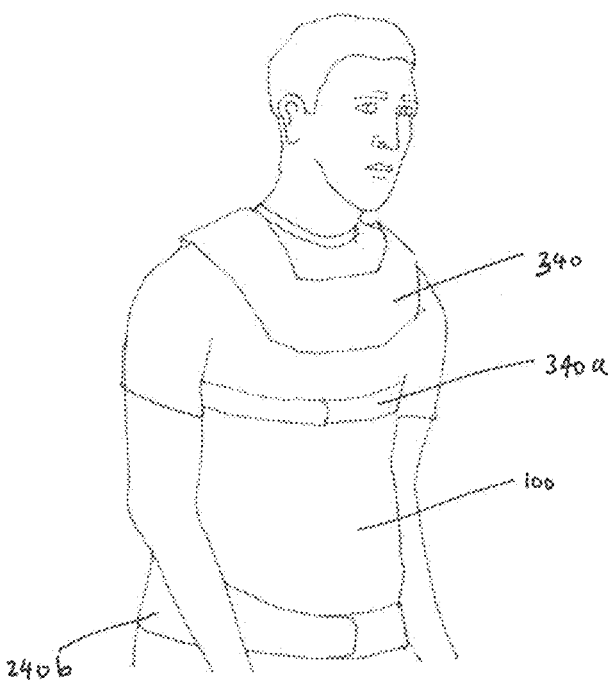
FIG. 10 is a front view of an alternative platform for an exoskeleton system in accordance with an embodiment of the disclosure.

FIG. 10 illustrates an alternative platform 340 for use with an exoskeleton system in accordance with an embodiment of the disclosure. Platform 340 when viewed from the rear adopts a configuration substantially identical to that shown in FIG. 8. However, when viewed from the front (as per FIG. 10) it can be seen that platform 340 has a yoke configuration at the front as opposed to the individual right and left shoulder sections 240c of the embodiment shown in FIG. 9. The yoke configuration of the platform 340 extends across the upper part of the user's chest continuously from one shoulder to the other. In other words, the right and left shoulder sections 240c of the platform 240 are rigidly joined at their respective fronts by a member that extends across the user's chest.

FIG. 10 also shows that the platform 340 includes an adjustable sternum strap 340a that connects between the back part of the right and left shoulder sections 340 and around the user's body so that the sternum strap 340 can extend under the user's arms and across the chest. Lower back section 240b forms a hip or waist belt with girth adjustment. The adjustment mechanism may be located at the user's front and/or back.

It is envisioned that the platform 340 may hang on the user's body and sit in such a manner that the straps 242 as described in relation to the platform 240 may not be required. Alternatively, similar straps could be attached to the platform 340.

It is recognized that the efficiency of the exoskeleton system 200 is improved when the length of the cables 230 included therein are correct for the user 100. Correct length is achieved when the cables 230 extend substantially vertically when the user 100 is in a standing position. Accordingly, it is advantageous for the system 200 to include some arrangement to fine tune the length of the cables 230 and more particularly the length of the outer sheaths 230b. One method envisioned is to incorporate an "in line" adjustment for the outer sheath 230b. This system may take the form of a coupling at the thigh region of the user's leg that operates like a turnbuckle having left and right hand threads which can be operated to either lengthen or shorten the outer sheath 230b as required.

Ideally, some arrangement should be incorporated to facilitate relatively easy loading of the backpack 250 onto the attachment couplings 280 of the platform 240 when the exoskeleton system 200 is in use. In certain embodiments, the backpack 250 is loaded onto the attachment couplings 280 in such a way that the user 100 can achieve loading without assistance. It is envisioned that this may be achieved by having two straps at top of the frame of backpack 250, enabling the user 100 to lift the backpack 250 up their back, past the attachment couplings 280 and to then drop the backpack 225 into place on the attachment couplings 280. The hooks 282 of the attachment couplings 280 could be spring loaded to snap back (like a ratchet) into place and to ensure engagement with or under a cross brace on the frame of backpack 250. In certain embodiments, such an arrangement to incorporate a mechanism configured to quickly jettison the backpack 250 in an emergency situation. One way this could be achieved would be by using a catch within the hook 282 that is released by a cord near the shoulder (i.e., similar to a rip cord on a parachute) enabling the backpack 250 to be dumped.

It is also envisioned that in a further embodiment of the disclosure, the weight of a body armour system worn by the user could be transferred to the ground via the exoskeleton system. For example, the weight of the body armour could be hung off an attachment coupling or the like secured to the harness.

It is envisioned that the exoskeleton systems described previously could be modified to exclude the leg braces. Although it is advantageous to secure each Bowden cable as discussed previously, other ways for securing each Bowden cable along the length of the user's legs are envisioned. For example, the user could be provided with an item of clothing that has suitable non-rigid load transferring members in built or attached thereto. An example of such a non-rigid load transferring member would be a Bowden cable. Such a cable may extend down each outer leg of the item of clothing with the upper end of the inner cable arranged for connection to the attachment coupling of the harness and the lower end arranged for connection to the interface device located on the user's boot. The upper and lower ends of the outer sheath of the Bowden cable would need to be fixed to prevent movement in the direction of the load applied to the upper end of the inner cable. The Bowden cable of each leg would be positioned so as to align with the centre of the user's leg, as viewed from the sagittal plane. The Bowden cable may be embedded into the fabric of the item of clothing or otherwise secured or bonded to the item of clothing in a manner that whilst enabling the user to move freely, still maximises the efficiency of the transfer load being transferred to the ground via the Bowden cable. The item of clothing may be a body suit.

The item of clothing may need to incorporate some form of bracing to prevent unwanted buckling of the Bowden cable, whilst still enabling the user to move through a required range of movement. The item of clothing may adopt different forms. However, it is envisioned that the item of clothing may adopt the form of compression leggings similar to those worn by some athletes. It is also envisioned that multiple Bowden cables may be included in each leg of the item of clothing. The material of the item of clothing may be made from spandex or elastane materials (e.g., lycra).

It is also envisioned that the item of clothing could be made from one or more lengths of fabric incorporating at least one non-rigid member. The non-rigid member of the fabric may adopt any form capable of transferring a load from an upper end thereof to a lower end. The non-rigid member may, for example, adopt the form of an inner cable housed within an outer sheath. The non-rigid member may thus be a Bowden cable. It is envisioned that the fabric may include a plurality of non-rigid members extending substantially parallel to one another.

When the non-rigid member adopts the form of a Bowden cable, it is envisioned that an upper and a lower part of the outer sheath of the cable will be constrained from movement within or relative to the fabric from which the item of clothing is constructed.

From the above it will be understood that the present disclosure extends in one aspect to a fabric including at least one non-rigid member, said non-rigid member arranged so that when the fabric is used to construct a product, a load applied to an upper part of the non-rigid member of the fabric can be transferred to a lower part of the non-rigid member. It is envisioned that such a fabric could be used to construct a number or quantity of different products enabling applied load transfer from the upper part of the non-rigid member to the lower part of the non-rigid member and thus in turn to the ground or other load bearing surface via an interface device. In this manner, the applied load may be directed to the ground or other load bearing surface as desired.

Embodiments of the present disclosure are considered to be advantageous because:

the user has less load force through their musculoskeletal system compared to a backpack that does not include such a system, which should result in less strain on the musculoskeletal system, less injuries as a result of carrying this weight and greater endurance throughout load carrying tasks they have significantly less mass, especially distal mass, than typical prior art exoskeleton systems and have less impact on the human/load carriage system's centre-of-mass.

they do not attempt to mimic human kinematics. The non-rigid members (e.g., the cables 30, 230) do not have to align exactly with the wearer's skeleton. The ends of the non-rigid members (e.g., the cables 30, 230) just need to be located correctly (i.e., aligned and secured with the load's force input and output at the backpack frame and interface device), whilst the route and length of the cables 30, 230 could take a different path, but would typically follow the limbs for better integration with the user.

they are able to integrate relatively more easily and closely to the human form and do not require the complex calibration necessary with rigid-linked exoskeletons they are light in weight compared to typical rigid-linked prior art exoskeletons. For example, an embodiment of the disclosure (not including footwear) is likely to be approximately 3-4 kg in weight, whereas a human universal load carrier (HULC) exoskeleton weighs approximately 35 kg (24 kg without batteries)

they have low distal weight (e.g., weight on the feet) and distal weight contributes to high metabolic cost during locomotion when not required the cables can be packed away with relatively little encumbrance to the user are low cost compared to conventional exoskeleton systems have a relatively simple configuration and no requirement for electronic systems or power supply and are thus less likely to fail during use they do not include any sort of knee joint. Rigid-linked exoskeleton systems typically have a clutch-type system at the knee joint to lock the "knee" of the exoskeleton system at initial contact and loading response. This prevents the kinematic chain (the exoskeleton links) from buckling under load and the user trying to lock the system using his/her own muscles and joints, leading to injury they do not create noise during use and thus are advantageous where stealth is required.

The embodiments have been described by way of example only and modifications within the spirit and scope of the disclosure are envisioned. That is, the scope of the present disclosure is defined by the claims, which cover variants that are not explicitly described and equivalent embodiments. As such, changes may be made to the embodiments of the present disclosure described with reference to the attached drawings without, however, departing from the protective scope of the accompanying Claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A passive exoskeleton system comprising:
a load carriage arrangement configured to carry an applied load, and
at least one push/pull Bowden cable configured to transfer at least a first part of the applied load to the ground bypassing a musculoskeletal system of a user.

2. The passive exoskeleton system of claim 1, wherein the at least one push/pull Bowden cable is configured to extend between a location at which the first part of the applied load is applied to said push/pull Bowden cable and to a point within a designated distance away from a foot of the user.

3. The passive exoskeleton system of claim 1, wherein the at least one push/pull Bowden cable has an outer sheath constrained from movement at or within a designated distance of an upper part and a lower part.

4. The passive exoskeleton system of claim 1, which includes a load sharing device configured to transfer a second part of the applied load to the musculoskeletal system of the user.

5. The passive exoskeleton system of claim 4, wherein the second part of the applied load can be transferred to the musculoskeletal system of the user via a harness.

6. The passive exoskeleton system of claim 5, wherein the harness is configured to be located in use over two shoulders of the user.

7. The passive exoskeleton system of claim 5, wherein the harness includes a platform configured to at least limit downward movement of the harness in the direction of an applied load due to compression of soft tissue of the user and distribute the applied load evenly across the two shoulders of the user.

8. The passive exoskeleton system of claim 7, wherein the platform includes right and left rigid shoulder sections and a back section.

9. The passive exoskeleton system of claim 7, wherein the harness includes at least one of: a waist belt, a hip belt, and a sternum strap.

10. The passive exoskeleton system of claim 1, which includes an attachment coupling for connection to the load carriage arrangement, wherein said at least one push/pull Bowden cable is connected to the attachment coupling so that the first part of the applied load can be transferred to the ground bypassing the musculoskeletal system of the user.

11. The passive exoskeleton system of claim 10, wherein the attachment coupling is one of: permanently connected to the harness and connected by a quick release system to the harness.

12. The passive exoskeleton system of claim 1, wherein the load carriage arrangement includes a frame configured to support the applied load.

13. The passive exoskeleton system of claim 12, wherein the frame is configured to be one of: attached to one of: a backpack and another device, and integrated with one of: the backpack and the other device.

14. The passive exoskeleton system of claim 1, which includes at least one interface device configured to connect to the at least one push/pull Bowden cable and configured to interface between the at least one push/pull Bowden cable and the ground.

15. The passive exoskeleton system of claim 14, wherein the interface device is one of: configured to connect to an item of footwear, incorporated with the item of footwear, configured to connect to a prosthesis, and incorporated in the prosthesis.

16. The passive exoskeleton system of claim 1, which includes two push/pull Bowden cables.

17. The passive exoskeleton system of claim 16, wherein a first of the two push/pull Bowden cables is configured to run along a first leg of the user and a second is configured to run along a second leg of the user.

18. The passive exoskeleton system of claim 17, which includes at least one brace provided at a position along each leg of the user to enable attachment of the associated push/pull Bowden cable.

19. A fabric assembly comprising:
a material; and
a push/pull Bowden cable connected to the material, said push/pull Bowden cable being configured to transfer at least a part of a load applied to an upper part of the push/pull Bowden cable to a lower part of the push/pull Bowden cable.

20. The fabric assembly of claim 19, which includes a plurality of push/pull Bowden cable connected to the material, said push/pull Bowden cables arranged parallel to one another.

21. The fabric assembly of claim 19, wherein the push/pull Bowden cable is embedded in the material.

22. An item of clothing made from a fabric, said item of clothing comprising:
a push/pull Bowden cable configured to transfer at least a part of a load applied to an upper part of the push/pull Bowden cable to a lower part of the push/pull Bowden cable.

23. The item of clothing of claim 22, which includes a plurality of push/pull Bowden cable arranged parallel to one another.

* * * * *